United States Patent [19]

Persson

[11] Patent Number: 4,594,767

[45] Date of Patent: Jun. 17, 1986

[54] METHOD OF PRE-MOUNTING AN ANCHORAGE DEVICE

[75] Inventor: Bengt Persson, Götene, Sweden

[73] Assignees: Bertil Persson; Lars-Olof Aberg, both of Grotene, Sweden; part interest to each

[21] Appl. No.: 596,398

[22] Filed: Apr. 3, 1984

[30] Foreign Application Priority Data

Apr. 18, 1983 [SE] Sweden ............................ 8302139-4

[51] Int. Cl.[4] ............................................ B23P 19/02

[52] U.S. Cl. ........................................ 29/525; 249/83; 52/699; 52/707; 52/587

[58] Field of Search ...................... 29/525; 411/15, 44, 411/23; 249/83, 91, 93, 94; 52/699–701, 707, 587, 679

[56] References Cited

U.S. PATENT DOCUMENTS

| | | | |
|---|---|---|---|
| Re. 13,204 | 2/1911 | Jossart | 411/44 |
| 2,686,963 | 8/1954 | Freyssinet | 29/525 |
| 3,810,339 | 5/1974 | Russo | 52/700 |
| 4,365,782 | 12/1982 | Persson | 249/91 |

*Primary Examiner*—Howard N. Goldberg
*Assistant Examiner*—Leonard S. Selman
*Attorney, Agent, or Firm*—Burns, Doane, Swecker & Mathis

[57] ABSTRACT

A method of pre-mounting an anchorage device such as a spike into a concrete object said anchorage device being adapted for fastening the object onto a support surface. The method includes the steps of moulding and vibrating the object (1) in a mould, there being formed a guide recess (4) in the object and the object is being removed from the mould prior to curing the concrete. According to the invention there is formed, during the casting of the concrete object (1), a channel (5) extending from a location centrally of the bottom of the guide recess (4), practically through the object and to a location adjacent that surface of the object turned away from the guide recess. Then the object is removed from the mould and the concrete is cured. On forming the channel, this is given a tapering portion (8, 9) at the end thereof facing away from the guide recess and an approximately uniformly thick portion at the end thereof closest to the guide recess. During removal of the concrete object from the mould and during curing the concrete the channel is left unsupported and after the curing a semi-hard plastic sleeve (11) is inserted into the channel and then the spike is inserted into the sleeve. A certain portion of the sleeve is left to protrude beyond the bottom surface of the guide recess.

7 Claims, 1 Drawing Figure

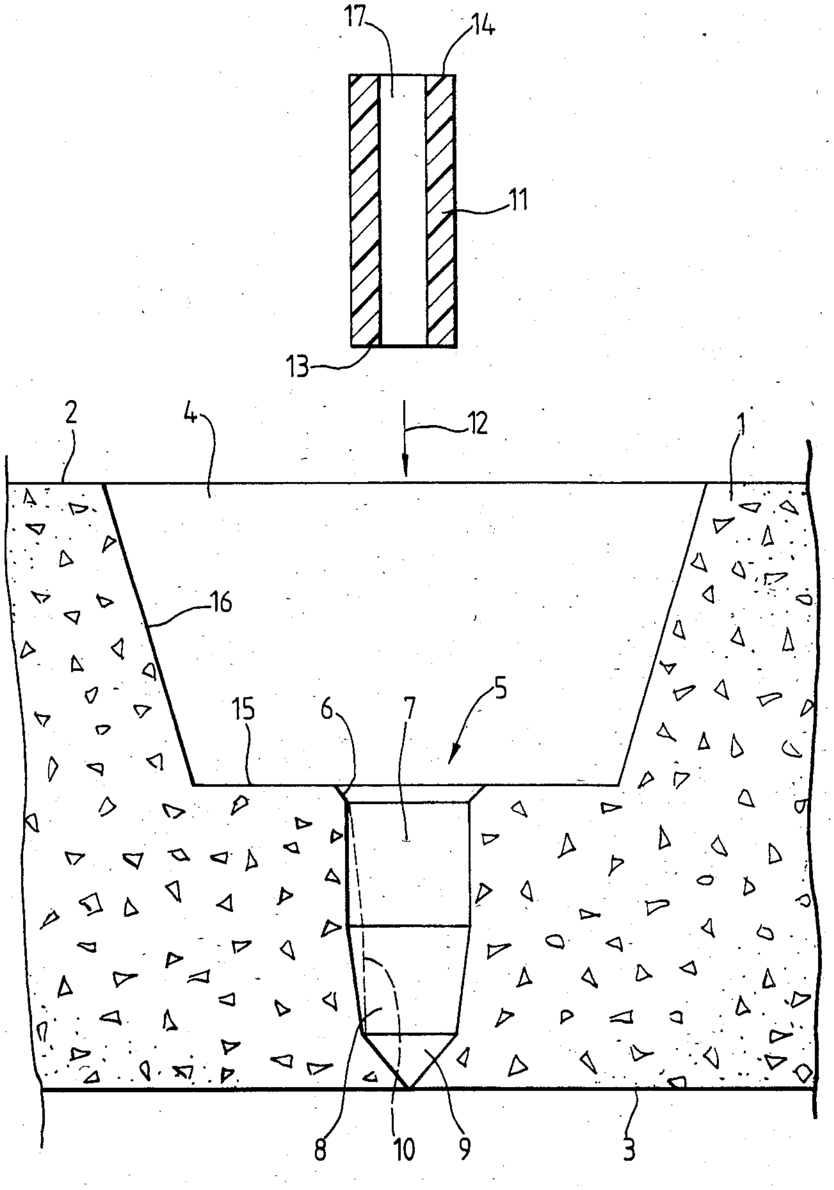
17
14
11
13
2
4
12
1
16
15
6
7
5
8
10
9
3

METHOD OF PRE-MOUNTING AN ANCHORAGE DEVICE

FIELD OF INVENTION

The present invention relates to a method of pre-mounting an anchorage device in a concrete object, the anchorage device being used for fixedly retaining the concrete object against a suitable substrate and comprising, for example, a spike extending through the concrete object.

BACKGROUND OF THE INVENTION

Fixed retention of concrete objects against a suitable substrate occurs in many different situations. One example of such a situation is the fixed retention of concrete curbstones which rest on, for example, a road surface of asphalt and are fixedly retained therein.

Curbstones which are designed for such use are known in many different variations, in one such variation the curbstone having incast iron strips in whose free ends holes are provided which serve to accommodate the spikes fixedly retaining the curbstones. A further embodiment is provided with an elongated projection on the rear face of the curbstone in which there are cast plastic sleeves which in their turn serve to accommodate and guide those spikes which fixedly retain the curbstone to the substrate.

For reasons of strength, the above-mentioned types of curbstones are made of a relatively wet concrete mixture which contains amounts of large aggregates, often having a size up to 15–18 mm. The concrete mixture is cast in molds of steel, the concrete mixture being brought to such a compact and blister-free state as possible by means if vibration. Considerable problems are involved, in such a manner of manufacture, in casting various objects into the curbstone which objects may need extremely accurate alignment in relation to the rest of the curbstone, because of the necessary vibration. On the one hand, such an object must naturally, be fixedly retained at a sufficiently efficient level in the molding tool so as not to be deranged from its position during the vibration, and, on the other hand, a very liquid concrete slurry will be separated during the vibration operation and has an extremely troublesome tendency to penetrate into all nooks and crannies, for which reason, for example, a plastic sleeve cast into the concrete runs the risk of being filled with this concrete slurry.

The inventive concrete objects are manufactured in great quantities using automatic machinery. To allow that also the spikes be mounted automatically into the plastic sleeves it is necessary both that the concrete object itself has close tolerances and that the concrete object can be carefully positioned in relation to the mounting mechanisms for the spikes. Further, it is necessary that the plastic sleeves be positioned with close tolerances in the concrete object.

OBJECT AND SUMMARY OF THE INVENTION

Consequently, the object of the present invention is to realize a method of pre-mounting an anchorage device in an object manufactured of concrete, a sleeve being used for retention of the anchorage device in the concrete object.

This object is achieved according to the invention by means of a method which comprises the concrete object being manufactured by casting and vibration of a concrete mixture in a mold, a guide recess in the concrete object being formed and the concrete object being removed from the mold before curing of the concrete, the method being characterized in that there is formed, on casting of the concrete object, a channel from a centrally located region at the bottom of the guide recess, which extends towards an opposing defining surface of the concrete object in relation to the guide recess, that the concrete object is cured, that a tubular retaining body is inserted, after the curing of the concrete, into the channel; and that the anchorage device is urged into this retaining body.

In one highly advantageous practical embodiment of the present invention, the channel is left unsupported after removal of the concrete object from the mold and during the curing of the concrete.

In order to facilitate the insertion of the retaining body in the channel and its positional fixation therein, the channel is formed, according to the present invention, with a tapering portion at its end turned to face away from the guide recess and with a portion of approximately even thickness at its end turned to face the guide recess.

In removing the concrete object from the mould and in its handling, for example, during transport and the like, before the concrete object has cured, and also during the curing process proper, both configurational changes and dimensional changes occur in the concrete object. According to the present invention, it is therefore appropriate that the channel be formed so as to have, after removal of the concrete object and curing of the concrete, adapted shape and dimensions in relation to the retaining body.

DESCRIPTION OF THE DRAWING

The invention will now be described in greater detail with reference to the accompanying drawing which shows a cross-section of a concrete object which is constructed in accordance with the embodiment of the present invention.

DETAILED DESCRIPTION OF THE PREFERRED EMBODIMENT

The drawing shows a part of a concrete object 1 having an upper defining surface 2 and a lower defining surface 3. The lower defining surface is that surface which is intended to be placed against a substrate and is to be fixedly pressed or retained thereagainst. For example, the part of the concrete object 1 shown on the drawing may consist of a projecting strip which is disposed on the rear face of a concrete curbstone which, for example, may constitute a pavement curbstone. This projecting strip lies, in such an event, with the lower face 3 against the asphalt substrate of the roadway and is embedded in the pavement paving when this is applied.

In its upper surface, the concrete object has a number of guide recesses 4 which may suitably be of frustoconical configuration and whose purpose will be described in greater detail below. At the center of the circular bottom surface of the guide recesses, there is disposed a channel 5 extending substantially completely through the concrete object and suitably having an upper, short and funnel-shaped entering portion 6 and a subjacent essentially cylindrical portion 7, a spiculated conical portion 8 and a short, obtuse conical portion 9 whose tip is tangential to the lower surface 3 of the concrete object.

On production of the concrete object, this is cast in a mold which preferably is manufactured of metal and, suitably, steel so as to be able to withstand the great stresses which arise on vibration of the concrete matter in the mold tool. On production of the concrete object, the mold tool is suitably inverted in relation to that intimated on the drawing, whereby that surface of the tool which will define the upper surface 2 of the concrete object will be a bottom surface in the mold tool. This entails that the lower surface 3 of the concrete object will, during the manufacturing phase proper in the mold be turned to face upwardly. This surface 3 may, hereby, be possibly completely free whereby filling of the tool with concrete mixture will be facilitated.

At the bottom surface of the mold tool which, thus, during the mold process proper, will define the upper surface 2 of the concrete object, there is disposed a frusto-conical body which is of the same shape and size as the contemplated guide recess 4 in the concrete object. This body on the mold tool has, furthermore, a projecting pin which is of a configuration which corresponds entirely to the above-described configuration of the channel 5. This entails that the total height of the frusto-conical body and the pin corresponds quite closely to the intended thickness of the concrete object, in other words the distance between the surfaces 2 and 3. Once a suitably measured amount of the concrete mixture has been poured into the mold tool, this is possibly compacted and thereafter carefully vibrated so that all nooks and crannies of the mold tool are completely filled and air bubbles and the like have been removed from the concrete, the vibration operation being then discontinued, whereafter the mold tool is inverted and the cast concrete object is placed on a support surface which thus will abut against the lower surface 3 of the concrete object. Release from the mold may in itself entail problems, since, during the vibration of the concrete mixture, there is separated off a highly liquid concrete slurry which, between the concrete object proper and the walls of the molding tool, realizes very powerful adhesion and suction forces. This entails that release from the mold in itself may subject the concrete object to minor deformation, in particular since the concrete object, during the final phase of release from the mold, is allowed to fall a short distance down onto the support surface.

Once the concrete object has, in this manner, been cast, vibrated and released from the mold, the support surface with the concrete object resting thereon is transported to a suitable site where curing of the concrete can take place before any further operations are commenced.

In order to attain the highest degree of strength in the concrete object, this is made from a relatively wet concrete mixture which entails that the form stability of the concrete object is relatively poor before the concrete has cured. It follows from this that even the channel 5 runs the risk of being slightly deformed during the mold release phase, the subsequent transport and also, to a certain extent, during the curing process itself. An example of deformation which regularly occurs in the form of the channel is shown by means of a ghosted line 10. It will be apparent from this line that the concrete object, in the central region of the channel, has a marked tendency to flow out so that the diameter of the channel at this point is reduced. In addition to these purely mechanical deformations, there subsequently occur during the curing process, minor shrinkage movements which are dependent upon the water content, type and amount of ballast in the concrete etc. Taken as a whole, it is to be expected that the cross-sectional area of the channel may with good approximation be illustrated by the ghosted line 10 once the concrete object has completely cured. This entails that, after the curing, the channel will have its lower, obtuse conical portion 9 relatively unchanged, whereas, on the other hand, the acute conical portion 8 will be converted into an approximately cylindrical or at least uniformly thick portion. On the other hand, the upper and originally approximately cylindrical portion 7 of the channel 5 will be converted into a downwardly tapering or possibly conical portion.

Once the concrete object has cured, a plastic sleeve 11 is inserted into the channel 5 in a direction of the arrow 12. This plastic sleeve is made from a semi-hard plastics material and is pressed down into the channel with relatively tight fit so far that its lower end 13 will come into abutment against the obtusely conical surfaces in the lower obtusely conical portion 9 of the channel 5. When the plastic sleeve has been forced down thus far and positionally fixed axially, its upper end 14 will be located slightly above the bottom surface 15 of the guide recess 4. As an alternative the plastic sleeve may have an annular, starshaped, square or otherwise shaped flange or rim portion, which, after the plastic sleeve 11 has been seated in the channel 5, extends above the bottom surface 15 and is supported on it. Such flange or rim portion has a bigger outer diameter than the rest of the sleeve. The reason for this will be apparent below.

On insertion of the plastic sleeve 11 in the channel 5 use is made of an assembly apparatus which consists of an insertion device for the plastic sleeve and a driver moveable in the direction of the arrow 12 and abutting aginst the upper end 14 of the plastic sleeve so as to urge the plastic sleeve downwardly into the channel 5. In order to simply align the assembly apparatus in relation to the channel, the assembly apparatus is provided with a nose portion whose outer surface is frusto-conical and which accurately corresponds to the frusto-conical circumferential surface 16 in the guide recess 4. This thereby ensures the full guarantee that the plastic sleeve will lie centrally in the channel 5 when the driver is in operation. Thus, there is no reason to fear that the plastic sleeve will end up eccentrically in relation to the channel 5. As an alternative the lower end 13 of the plastic sleeve may be somewhat pointed or conical in order to reduce the needs for too close tolerances of the concrete object.

When inserting the plastic sleeve 11 into the channel 5 considerable frictional forces may occur, especially at the end of the insertion. if the driver has a somewhat pointed, e.g. conical or frusto conical surface, for cooperating with the upper end 14 of the sleeve, then this upper end may be expanded by the driver so that the channel 17 will have a bell-shaped upper end portion. Optionally, the driver could be shaped for splitting or at least expanding the upper end portion 14 of the sleeve also externally so that the sleeve is given an expanded rim portion or flange for being positioned, after insertion of the sleeve in the channel 5, above the bottom surface 15 and abutting it, such a rim portion or flange has the purpose of protecting the concrete material from being hit directly by the head of a spike when driving it through the plastic sleeve.

Once the plastic sleeve has been mounted in the concrete object, this is moved to the next working station where an assembly apparatus corresponding to that used for the plastic sleeve is used for urging the anchorage device which is to be pre-mounted interiorly into the plastic sleeve. In one practical embodiment, the anchorage device often consists of a spike of square cross-section, the spike being spirally turned about its longitudinal axis. Furthermore, the spike is as a rule manufactured of hardened material so that it can, despite possible very tight fit in the plastic sleeve, be knocked down therethrough and penetrate down into, for example, a hard asphalt substrate.

If, as indicated above, the plastic sleeves are given bell-shaped upper end portions the need for carefully aligning the spikes with the channels 17 of the plastic sleeves 11 will be very much reduced.

Also the assembly apparatus used for mounting the anchorage device in the plastic sleeve has a nose portion with a frusto-conical surface which, in abutment against the circumferential surface 16 of the guide recess, centers the assembly apparatus and thereby ensures that the anchorage device always lies centrally in the channel 17 of the plastic sleeve.

Suitably, the assembly apparatus forces the anchorage device so far down into the plastic sleeve that the tip of the anchorage device is located down in the obtuse conical portion 9 of the channel 5.

When the concrete object is to be used the above-described anchorage devices are pre-mounted in each plastic sleeve 11. Suitably, the anchorage devices extend, as mentioned above, down into the concrete object to a region immediately above its lower surface 3, but suitably not past this surface, whereby the concrete object may be placed on a substrate and easily shifted along the substrate for purposes of positional adjustment. When, in this manner, the concrete object arrives at its correct position, the anchorage devices are knocked down through the plastic sleeve so that the tip of the anchorage device penetrates the thin wall of concrete which may possibly remain at the tip of the obtuse conical portion 9 of the channel 5. As a result of the above-described design of this portion, there is no risk that the anchorage device knock out large chips of the concrete material on the underface 3 of the concrete object which might possibly raise the concrete object from its substrate.

In order to reliably fix the concrete object in the substrate, the anchorage device is driven down through the plastic sleeve so far that a head disposed on the upper end of the anchorage device will come into abutment against the upper end 14 of the sleeve and also possibly deform this to a slight extent. As a result, the sleeve will be partly compressed in the axial direction, whereby the grip of the sleeve partly against the surrounding concrete material and partly against the anchorage device will increase. Furthermore, the upper end 14 of the plastic sleeve constitutes a direct protection for the concrete material so that the head of the anchorage device does not come into direct abutment with the concrete material which could entail a risk that the concrete material be cracked.

In one practical embodiment, the plastic sleeve 11 may have an outer diameter of 9 mm and a length of 25 mm. With this dimensioning of the plastic sleeve, it is suitable that the upper cylindrical portion 7 of the channel 5 have a diameter of approximately 11 mm in conjuntion with the casting of the concrete object, in other words prior to the subsequent deformations and shrinkage phases. Furthermore, the height of this portion should amount to approximately half of the length of the plastic sleeve. The lower, acute conical portion 8 of the channel 5 should have a diameter at its minor end which slightly exceeds the outer diameter of the plastic sleeve or which amounts approximately to 9.5 mm. The height of the acute conical portion 8 should, with the above-mentioned dimensioning of the plastic sleeve, amount to approximately the diameter of the plastic sleeve. Finally, the height of the lower, obtuse conical portion 9 of the channel 5 should amount to approximately 5 mm. The above-indicated dimensions of the channel 5 entail that the central portion of the channel will, in the vertical direction, be located approximately at the point of union between the cylindrical portion of the channel and its acute conical portion, in other words that region where deformation of the channel may be expected to be greatest will be in this region.

As an alternative, the channel 5, as a whole or only a part of it, may have a smaller diameter so that the plastic sleeve 11 is compressed and shaped by the channel when inserted therein.

Furthermore, the plastic sleeve 11 may have such inner diameter that the anchorage device will be accommodated with tight fit therein already before the plastic sleeve is pressed down into the channel 5. This entails that at least those portions of the plastic sleeve which come into abutment with the corner regions of the anchorage device will be broadened diametrically outwardly so that the plastic sleeve is thereby expanded into harder abutment against the concrete object.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes and variations which come within the meaning and range of the claims are therefore intended to be embraced therein.

What is claimed is:

1. A method of manufacturing a concrete object having a guide recess with a bottom surface, a sleeve and an anchorage device pre-mounted in said sleeve, comprising the steps of:

molding concrete in a mold to form said concrete object;

during said molding step, forming a channel located at a central portion of said bottom surface, said channel having an obtusely tapered first channel portion at an end of said channel remote from said bottom surface;

vibrating said concrete object while said concrete object is in said mold;

before said concrete hardens, removing said concrete object from said mold without support for said channel;

hardening said concrete object without support for said channel, so that during said removing and hardening steps said channel deforms;

utilizing said guide recess to align said sleeve with said channel;

inserting said sleeve into said channel until an end of said sleeve abuts said obtusely tapered end of said channel, the other end of said sleeve protruding from said bottom surface; and pre-mounting said anchorage device in said sleeve.

2. The method of claim 1, further comprising the steps of during said molding step, forming said channel with a second channel portion adjacent said bottom surface, said second channel portion having a substantially uniform width, and a third channel portion between said second channel portion and said obtusely tapered first channel portion, said third channel portion tapering acutely toward said obtusely tapered first channel portion.

3. A method of manufacturing a concrete object having a sleeve and an anchorage device pre-mounted in said sleeve, comprising the steps of:

molding concrete in a mold to form said concrete object;

during said molding step, forming a channel in said concrete object, said channel including an obtusely tapered first channel portion at one end and a second channel portion between said first portion and an opposite end, said second channel portion being larger in cross-section than said sleeve;

before said concrete has hardened, removing said concrete object from said mold without support for said channel;

hardening said concrete object without support for said channel, so that during said removing and hardening steps said channel deforms;

inserting said sleeve into said channel after said hardening step; and pre-mounting said anchorage device in said sleeve.

4. The method of claim 3, wherein said pre-mounting step expands said sleeve.

5. The method of claim 3, wherein said concrete object has a guide recess having a bottom surface, said method further comprising the steps of during said molding step, locating said channel at a central region of said bottom surface, forming said second channel portion adjacent said bottom surface and with a substantially uniform width and forming an acutely tapering channel portion between said second channel portion and said obtusely tapered first channel portion.

6. The method of claim 5, wherein said inserting step abuts an end of said sleeve against said obtusely tapered first channel portion, said sleeve having a length sufficient to protrude from said bottom surface.

7. The method of claim 5, further comprising the steps of utilizing a surface of said guide recess to guide said sleeve into said channel and to guide said anchorage device into said sleeve.

* * * * *